United States Patent
Haddad et al.

(10) Patent No.: US 10,193,984 B2
(45) Date of Patent: Jan. 29, 2019

(54) ARCHITECTURE FOR ENABLING FINE GRANULAR SERVICE CHAINING

(71) Applicant: Telefonaktiebolaget LM Ericsson, Stockholm (SE)

(72) Inventors: Wassim Haddad, San Jose, CA (US); Heikki Mahkonen, San Jose, CA (US); Ravi Manghirmalani, Fremont, CA (US); Joel Halpern, Leesburg, VA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 177 days.

(21) Appl. No.: 14/956,142

(22) Filed: Dec. 1, 2015

(65) Prior Publication Data
US 2017/0155724 A1 Jun. 1, 2017

(51) Int. Cl.
| | |
|---|---|
| G06F 9/455 | (2018.01) |
| H04L 12/24 | (2006.01) |
| H04L 12/26 | (2006.01) |
| H04L 29/08 | (2006.01) |
| H04L 29/12 | (2006.01) |

(52) U.S. Cl.
CPC .......... *H04L 67/16* (2013.01); *G06F 9/45541* (2013.01); *G06F 9/45558* (2013.01); *H04L 41/5051* (2013.01); *H04L 43/18* (2013.01); *H04L 61/203* (2013.01); *G06F 2009/45562* (2013.01); *G06F 2009/45575* (2013.01)

(58) Field of Classification Search
CPC ........ H04L 67/16; H04L 41/18; H04L 61/203
See application file for complete search history.

(56) References Cited

U.S. PATENT DOCUMENTS

| | | | | |
|---|---|---|---|---|
| 2014/0259012 A1* | 9/2014 | Nandlall | ............... | H04W 4/003 718/1 |
| 2016/0050125 A1* | 2/2016 | Mattson | .............. | H04L 41/5051 709/225 |
| 2016/0139939 A1* | 5/2016 | Bosch | ................... | H04W 4/003 718/1 |

OTHER PUBLICATIONS

Dow et al. "The Xen Hypervisor," posted Apr. 10, 2008 at <http://www.informit.com/articles/article.aspx?p=1187966&seqNum=7>.*

"Mirage OS, A programming framework for building type-safe, modular systems," Xen and Linux Foundation, downloaded from https://miraga.io/ on Nov. 29, 2015, 2 pages.

Madhavapeddy, et al.,"Jitsu: Just-In-Time Sumnoning of Unikernels," May 6, 2015, Retrieved from the Internet: <URL: https://www.usenix.org/system/files/conference/nsdi15/nsdi15-paper-madhavapeddy.pdf>, [retrieved on Jan. 3, 2017], 16 pages.

(Continued)

*Primary Examiner* — Scott B Christensen
(74) *Attorney, Agent, or Firm* — Nicholson, De Vos, Webster & Elliot, LLP (57) ABSTRACT

A network device implements a method for providing a service chain in a network by instantiating services on demand using a lightning module. The lightning module provides the services as applications executed by a unikernel where the unikernel is supported by a hypervisor. The method further includes receiving authentication, administration and accounting (AAA) service authentication of a user by the lightning module, instantiating a special unikernel to monitor a session for packets from the user, and instantiating service chain unikernels identified in at least one unikernel configuration file, in response to receiving a packet from the user.

17 Claims, 8 Drawing Sheets

(56) References Cited

OTHER PUBLICATIONS

Manco, et al.,"The Case for the Superfluid Cloud," Jul. 7, 2015, Retrieved from the Internet: <URL:https://www.usenix.org/system/files/conference/hotcloud15/hotcloud15-manco.pdf>, [retrieved on Jan. 3, 2017], 6 pages.

* cited by examiner

ARCHITECTURE FOR ENABLING FINE GRANULAR SERVICE CHAINING

FIELD

Embodiments of the invention relate to the field of service chaining, and more specifically, to a method of implementing a service chain using on demand services that minimize the resources required in a virtualized operating environment.

BACKGROUND

Virtualization refers to a computing environment that creates a virtual, rather than real, version of a hardware platform and/or software operating environment. Often the virtualization is implemented as a virtual machine that functions as a real computer with an operating system. Software can be executed in the virtual machine as though it were being executed on an actual computing system. However, the virtual machine separates the executing software from the actual computer hardware that it operates on. In some virtualized environments, a number of virtual machines may execute on a set of computer hardware. A 'set,' as used herein refers to any positive whole number of items including one item. A hypervisor is software that manages the actual computer hardware resources and the virtual machines access to these resources.

An additional concept in this virtualization space is referred to as containerization. Containers provide an operating space for applications where a kernel of an operating system allows for multiple isolated user-space instances, instead of a single user-space instance. Containerization simplifies the "virtualization" stack (i.e., the set of programs that implement virtualization such as the virtual machine and hypervisor) and enables the running of additional applications on a particular hardware platform or "host." However, the containerization technology constrains applications to run on the same kernel. In addition, container "light" security makes it difficult for cloud providers (a common use case for containers) to embrace "multi-tenancy" (where different customers utilize the same hardware in a cloud computing environment) with containers only. Such limitations have led cloud providers to run containers within virtual machines to provide greater security to each of the customers.

Both containers and virtual machines run on a full kernel of an operating, which introduces significant overhead because the kernel incorporates a large amount of unused code (aka "dead" code). A direct consequence of this set up is that a high number of bugs are present and a large "attack surface" renders the users of the cloud computing system vulnerable. In addition, containers take a long time to boot, which requires them to remain in active mode for most type of applications to be read to function when needed for high availability or low latency applications.

Virtualization is utilized in relation to service chaining in networks. Network functions can be virtualized (NFV) and organized by a controller. One possibility for such an implementation is via a controller in a software defined networking (SDN) architecture. However, SDN architectures are not widely utilized. SDN controller scalability and resiliency are two major challenges to be addressed in order to speed up SDN adoption. On one side, adding additional SDN controllers is a quick fix to address resiliency. However, the recovery time from link(s) failure may lead to significant packet loss and/or higher latency. Current trends suggest leaving enough intelligence in the data-plane, in order to cope with this issue, which is contrary to the SDN design. Thus, SDN is not a readily available option for use in service chaining.

SUMMARY

In one embodiment, a method is provided that is implemented by a network device. The method is for implementing a service chain by instantiating services on demand by a lightning module. The lightning module provides the services as applications executed by a unikernel where the unikernel is supported by a hypervisor. The method includes receiving authentication, administration and accounting (AAA) service authentication of a user by the lightning module, instantiating a special unikernel to monitor a session for packets from the user, and instantiating service chain unikernels identified in at least one unikernel configuration file, in response to receiving a packet from the user.

In another embodiment, a network device is configured to execute a method for implementing a service chain. Where the service chain is implemented by instantiating services on demand by a lightning module. The lightning module provides the services as applications executed by a unikernel that is supported by a hypervisor. The network device includes a non-transitory machine-readable storage medium, having stored therein the lightning module and the hypervisor database, and a processor coupled to the non-transitory machine-readable storage medium, the processor configured to execute the lightning module, the lightning module configured to receive authentication, administration and accounting (AAA) service authentication of a user, instantiate a special unikernel to monitor a session for packets from the user, and to instantiate service chain unikernels identified in at least one unikernel configuration file, in response to receiving a packet from the user.

In a further embodiment, a non-transitory machine readable medium is provided, having stored therein a set of instructions, which when executed cause a network device to perform a method. The method is for implementing a service chain by instantiating services on demand by a lightning module. The lightning module provides the services as applications executed by a unikernel supported by a hypervisor. The set of instructions further includes receiving authentication, administration and accounting (AAA) service authentication of a user by the lightning module, instantiating a special unikernel to monitor a session for packets from the user, and instantiating service chain unikernels identified in at least one unikernel configuration file, in response to receiving a packet from the user.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

The following description describes methods and apparatus for implementing a service chain by instantiating services on demand. The services are instantiated by a lightning module that instantiates the services as applications that are executed by a unikernel supported by a hypervisor in a virtualized operating environment. This process utilizes a special unikernel to monitor a communication session for packets from a session that is associated with given user. This special unikernel is instantiated after a user authentication is received and associated with the given session by the lightning module. When packets from session are received then the appropriate service can be instantiated in a service chain unikernel as defined by a unikernel configuration file. The lightning module and the process for instantiating services on demand reduces the overhead of the service chain implementation while providing low latency processing by use of unikernels to execute each of the on demand services.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

The embodiment overcome the issues of the prior art. The prior art of service chaining had a number of drawbacks. The embodiments address service chaining existing issues by introducing a new mechanism allowing bypassing suboptimal packets switching. SDN-based service chaining enables traffic steering between different virtual network functions (VNFs), but has inefficiencies in its operation. In SDN based service chaining traffic is required to "bounce" on the virtual switch (i.e., be forwarded to the controller) before being re-routed to the next hop VNF. The embodiments provide a process and system, which allows "on-demand" instantiation and chaining of dedicated micro-services (e.g., VNF) within a virtual router. The embodiments employ a new mechanism to instantiate, configure and stitch a particular set of VNFs together into a service chain. This process is combined with a structure that utilizes a low memory footprint per VNF, and is able to boost the number of VNFs running simultaneously. The process and structures of the embodiments are able to scale the to a large scale and serve a high number of tenants.

The embodiments provide advantages over the art, including providing a "zero-footprint" cloud, because the embodiments enable booting of VNF(s) when traffic is received and also to shutting down the same VNFs when a session is terminated. Similarly, the embodiments enable a fast instantiation of VNFs that enable the system to scale up or down. The embodiments eliminate traffic steering (i.e., no SDN involved) with the use of zero copy shared memory between the instantiated containers for implementing VNFs. The embodiments also provide improved security of the prior art.

The embodiments utilize unikernels to instantiate VNFs. The unikernels are managed by a hypervisor and a "lightning module" as described further herein below. A unikernel is as used herein is a single-purpose program designed to run in a cloud environment. Unikernels are compiled from a modular stack of application code, system libraries and configuration. They are not designed to run directly on hardware as they lack the code and complexity required for dealing with drivers, which makes unikernels fast to instantiated and terminate as well as limits their resource requirements. Furthermore, unikernels are not designed to support multi-user nor multi-process operation. Instead each unikernel is a single thread, which runs only one specific application. Unikernels run over a hypervisor (e.g., a XEN hypervisor or similar hypervisors) and/or in a container (e.g., Docker). One skilled in the art would understand that embodiments described herein with relation to running over a hypervisor can also run in a container.

Figure 1:
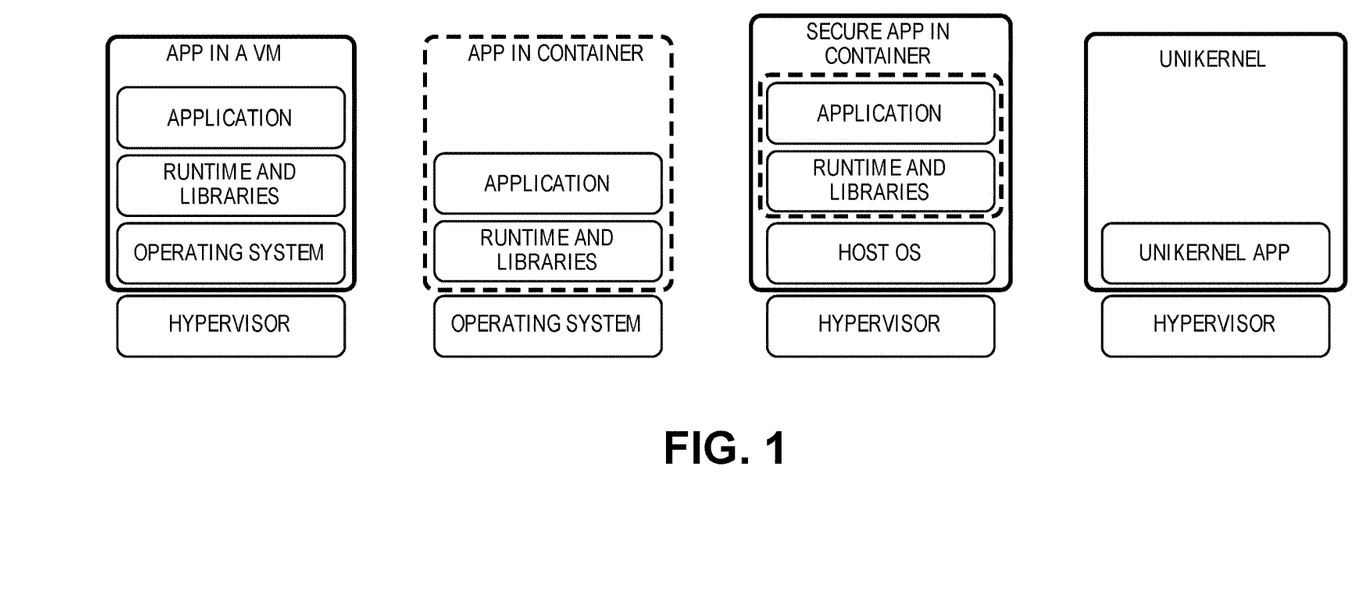
FIG. 1 is a diagram that illustrates the difference between virtual machines (VMs), containers and unikernels in implementing an application.

FIG. 1 is a diagram that illustrates the difference between virtual machines (VMs), containers and unikernels in implementing an application. Unikernel design removes the classic boundary between user space and kernel by slicing the latter into a set of modular and independent libraries and enabling each application to choose only the ones that are needed to run with the desired performance. As shown in FIG. 1, a VM implementation is built on a hypervisor that interfaces with the shared hardware. The virtual machine then abstracts and represents the hardware to the operating system that executes on the VM. The operating system is a full operating system that supports runtime modules and libraries that applications rely on for operation.

A container in contrast operates on an operating system. The container separates the user space such that different users have discrete user spaces operating on the same operating system. The runtime modules and libraries however are specific to the user space of the container. The application operates using these runtime modules and libraries within the container while using the general operating system. The hardware in this case can be interfaced by the operating system or in some cases there may be additional levels of abstraction. In addition, additional security can be utilized in conjunction with containers where the application is run in a secure container with the runtime modules and libraries. A host operating system can also operate in the container and a hypervisor manages the interface with the hardware of the platform.

As mentioned above, a unikernel has a simpler and 'lighter weight' implementation. The unikernel provides the specific environment necessary to execute an application. Thus, an application in a unikernel environment cannot rely on general runtime modules or libraries and interfaces directly with a hypervisor. This makes applications in the unikernel more specialized, more efficient, less resource intensive and faster too load and terminate. Thus, the embodiments have relied upon the use of unikernels to implement NFV as part of a service chaining process and structure.

Figure 2:
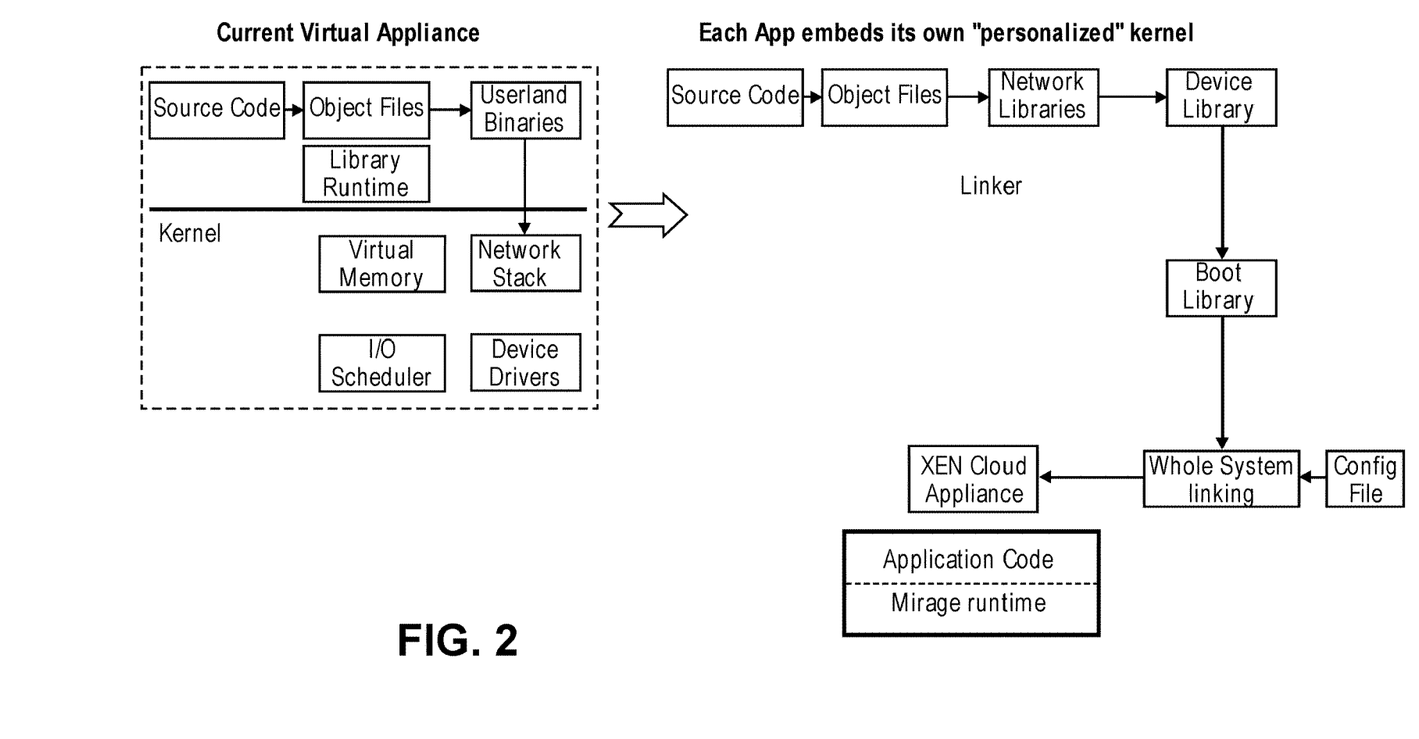
FIG. 2 is a diagram that illustrates the difference between current virtual appliance design and the unikernel implementation utilized in the embodiments.

FIG. 2 is a diagram that illustrates the difference between current virtual appliance design and the unikernel implementation utilized in the embodiments. As is illustrated the standard process for generating and executing an application in a standard virtualized environment is to compile source code of the application into object files. The object files are further compiled into binaries that can be executed in a user space and that may access runtime modules and libraries. The kernel of the operating system in these virtualized environments may provide a virtual memory space and access to the network stack for network communications. The kernel also provides the I/O scheduler and device drivers necessary for interfacing with the hardware.

In the embodiments, as an alternative to the standard compilation process for virtualized applications, the process creates a unikernel that functions as a specialized or 'personalized' kernel for an application. The process starts with the source code and complies it into object files. Needed network, device and boot libraries are added into the application. The complete unikernel and application are linked together and made available to the hypervisor and cloud platform (e.g., a XEN cloud appliance). This hypervisor and cloud platform may include a specialized runtime operating system such as the mirage operating system or similar operating system.

Figure 3A:
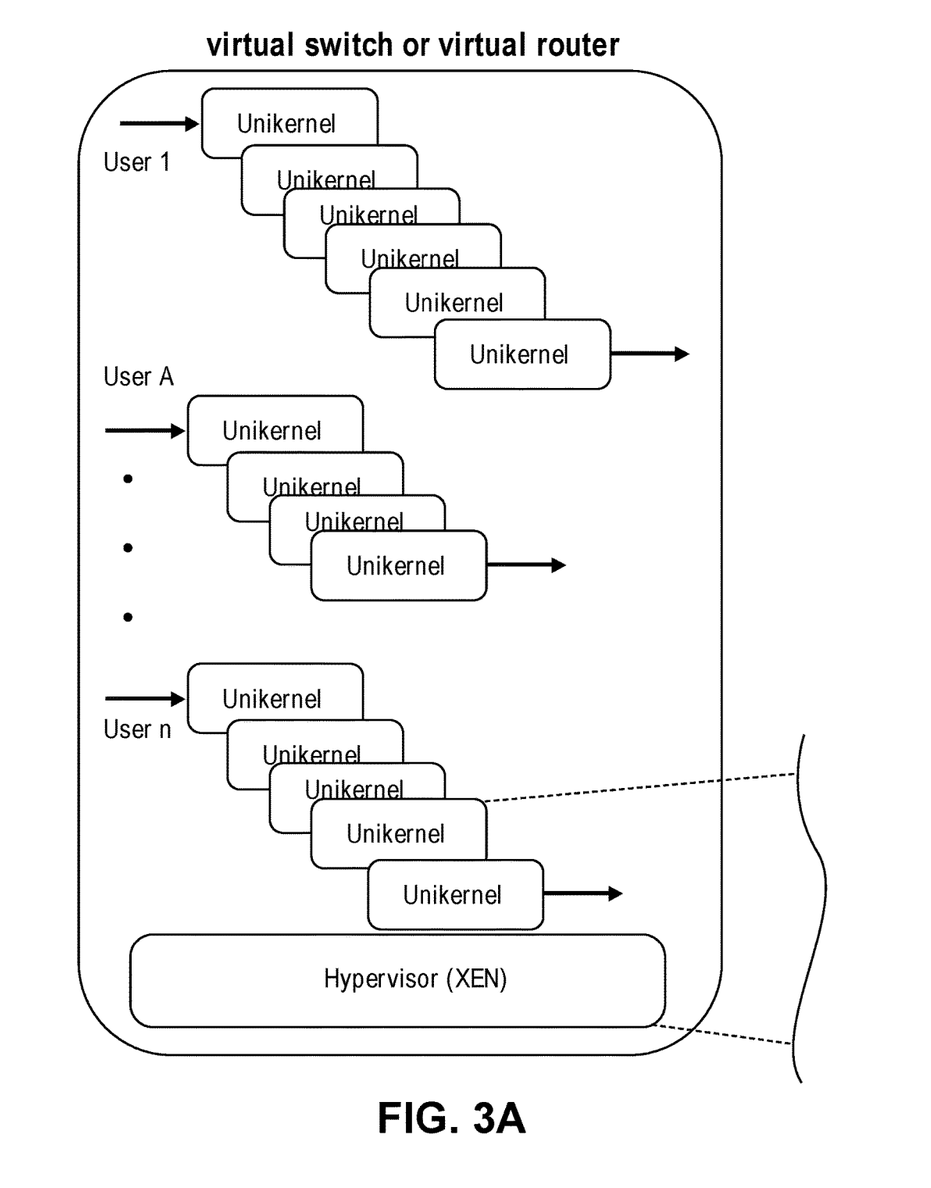
FIGS. 3A and 3B are diagrams of one embodiment of the system architecture.
Figure 3B:
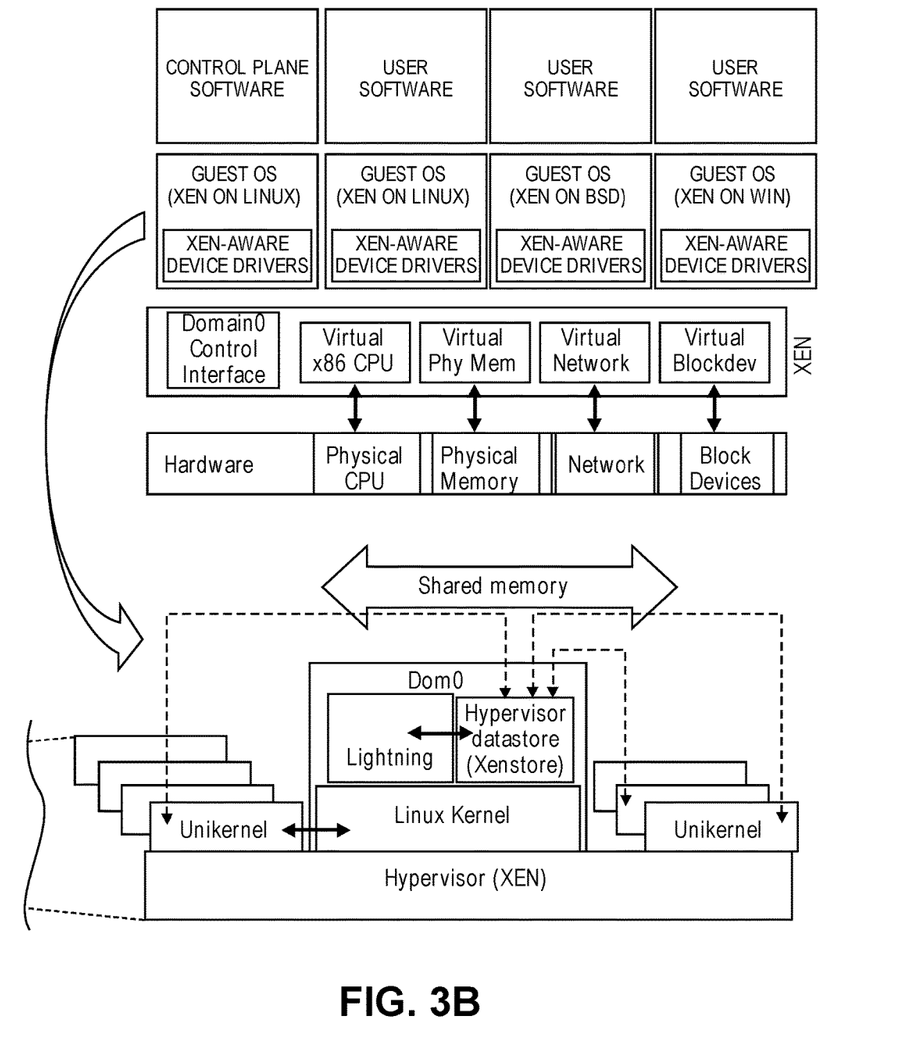

FIGS. 3A and 3B are diagrams of one embodiment of the system architecture. In the example embodiment, a Xen hypervisor is shown. However, one skilled in the art would understand that other types of similar hypervisors can be utilized. The Xen Hypervisor is an open-source type 1 or bare metal hypervisor, which makes it possible to run many instances of an operating system or indeed different operating systems in parallel on a single machine (or host). The Xen hypervisor is used as the basis for a number of different commercial and open source applications, such as: server virtualization, Infrastructure as a Service (IaaS), desktop virtualization, security applications, embedded and hardware appliances.

The illustrated embodiments of the architecture include a control domain (Domain0). This domain is a specialized virtual machine that has special privileges like the capability to access the hardware directly. This domain handles all access to the system's I/O functions and interacts with the other virtual machines. It also exposes a control interface to the outside world, through which the system is controlled. The example Xen hypervisor is not usable without Domain 0, which is the first VM started by the system. However, other equivalent hypervisor architectures can be utilized consistent with the embodiments of the A key module in Domain0 is the hypervisor database (i.e., in this example a Xenstore database) that is used to store information about the domains during their execution, i.e., hierarchical namespace shared between domains, and as a mechanism of creating and controlling Domain-U devices. The hypervisor database is meant for configuration and status information rather than for large data transfers. The hypervisor database (i.e., the Xenstore) supports transactions and atomic operations. Each domain gets its own path in the store. When values are changed in the store, the appropriate drivers are notified.

A hypervisor utilized in conjunction with the embodiments, such as a Xen hypervisor, may have characteristics including having a small footprint and interface (is around 1

MB in size). Because it uses a microkernel design, with a small memory footprint and limited interface to the guest, it is more robust and secure than other hypervisors. The hypervisor offers driver isolation, and paravirtualization. The example embodiment of the Xen hypervisor has the capability to allow the main device driver for a system to run inside of a virtual machine. If the driver crashes, or is compromised, the virtual machine containing the driver can be rebooted and the driver restarted without affecting the rest of the system. Similarly, the example Xen hypervisor provides fully paravirtualized guests that have been optimized to run as a virtual machine. This allows the guests to run much faster than with hardware extensions (HVM). Additionally, the hypervisor can run on hardware that doesn't support virtualization extensions.

The embodiments provide a process that utilizes an architecture such as that illustrated in FIGS. 3A and 3B for providing service chaining. This new service chaining mechanism is based on dynamic instantiation, configuration and stitching of a set of micro-services, running each as a part of a unikernel, which would serve a particular flow. By leveraging unikernel properties, it becomes possible to boot these micro-services at packet at round trip time (RTT) (i.e., at the time a packet is received and terminated when it returns from the service chain) thus, allowing to instantiate the entire chain upon receipt of first packet and removing it once the session ends (more details later). These micro-services are expected to run on a physical/virtual node, e.g., a virtual router or switch that can be implemented in any network device, computing device, cloud architecture or similar environment. In one embodiment, the Ericsson virtual switch may be utilized EVS. In some embodiments, the micro-services can be spread over multiple nodes to enable the system to scale to handle large volume of services and sessions.

In one embodiment, the process leverages unikernel properties of the hypervisor based architecture (e.g., such as the architecture based on Xen hypervisor). For this purpose, we introduce a new module, namely a "lightning" module, which would communicate with hypervisor datastore (e.g., a Xenstore module running in domain0). In the embodiments where the Xenstore is utilized, the Xenstore may be accessible by either a Unix domain socket in Domain-0, a kernel-level API (i.e., XenBus is the in-kernel API used by virtual I/O drivers to interact with Xenstore), or an input output control (ioctl) interface.

The "Lightning" module offers the following services, (1) unikernel identification and services chain configuration, e.g., request allocating a shared memory segment which would be accessible ONLY to a specific chain of unikernels, (2) interface with the authentication, authorization and accounting (AAA) server from which, the lightning module can receive policies to be applied on a specific flow, and (3) interface with other "lightning" modules that may be running on different nodes.

These services of the lightning module can be applied in the example illustrated in the architecture in FIG. 3A. In the example, as set of users and their assigned service chain are shown being implemented by a virtual switch or router (e.g., a EVS or EVR). "User A" has a service chaining consists of 4 unikernels, which are instantiated only after successful authentication of User A as described further herein below in reference to FIG. 4. Each unikernel in this service chain is assigned one unique functionality. After a unikernel finishes its task, it sends a signal, which allows the next "in-line" unikernel to do its job and so on. Such signal can be either sent to the next unikernel or to a central entity, such as the lightning module, which orchestrates the set of unikernels. Unikernels instantiation and configuration is built in the hypervisor (i.e., the "lightning module+Xenstore"). This process and architecture ensures isolation between tenants and/or users flows.

Figure 4:
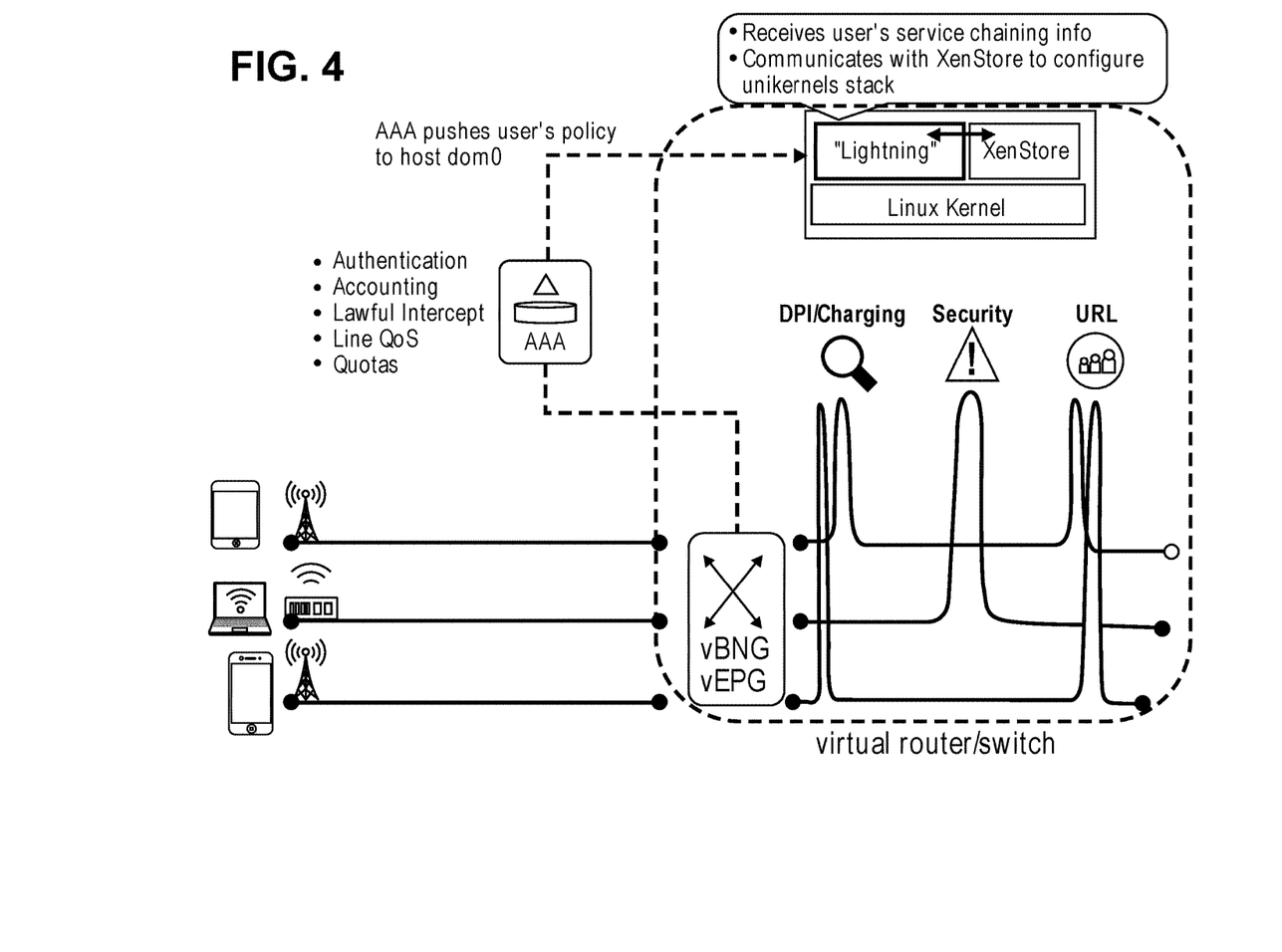
FIG. 4 is a diagram of one embodiment of the service chaining process at the network level.

FIG. 4 is a diagram of one embodiment of the service chaining process at the network level. The example illustration demonstrates a basic scenario applicable for both fixed and mobile broadband where the process and architecture and embodiments would be beneficial. Note that it is possible to instantiate unikernels in the customer premise equipment (CPE), Radio Base station (RBS), WiFi access point, or similar devices.

The basic scenario is described in the following steps (in order): (1) a user attaches to the CPE and the RBS then initiates authentication via the AAA; the AAA communicates the user's service chain to the lightning module; (3) the "lightning" module writes the service chain configuration into hypervisor datastore (e.g., a Xenstore where it may be stored as subtrees); (4) the hypervisor datastore then translates the requirements of the service chain configuration into unikernels "config" files; (4) a special unikernel0 (U0) is instantiated and is allocated shared memory to use with remaining unikernels for the given service chain; (5) upon $1^{st}$ packet arrival, U0 notifies the hypervisor datastore (e.g., a Xenstore) to instantiate the rest of the chain; and (6) when the session is closed, unikernel0 sends notification to hypervisor datastore (Xenstore) to remove the entire chain (including U0).

As applied to the example of FIG. 4, the user equipment connects to a virtual border network gateway (vBNG) or virtual evolved packet gateway (vEPG). The vBNG or vEPG can be part of a virtual router or switch. The virtual router or switch can be implemented by any number of network devices, computing devices or similar devices. When a session is initiated with the user equipment and connects with the virtual router or switch at the vBNG or vEPG then an authentication request may be made from the AAA server. The AAA server can determine the authentication, accounting, lawful intercept, line Quality of Service (QoS), quotas and similar policies and metrics. The AAA determination is then returned to the virtual router and switch. The AAA determinations are provided to the lightning module. The lightning module receives the service chaining info of the user and communicates with the hypervisor database (i.e., the XenStore) to configure a unikernels stack (i.e., a special unikernel and the set of unikernels that provide the micro-services of the service chains for the session). As traffic is then received from the user equipment at the vBNG or vEPG then the special unikernel detects the session data traffic from the user equipment and instantiates the unikernels of the service chain as needed. As each micro-service completes it signals to the lightning module that the micro-service has finished and then the next micro-service is instantiated. Thus, only the current active micro-service is being executed in its unikernel at any given time. Once all of the services have been executed then the last unikernel and the special unikernel are terminated. In the illustrated example, the service chain includes deep packet inspection (DPI), charging, security, uniform resource locator (URL) resolution or similar services. Each of these services implemented by a virtualized function operating in a unikernel managed by the lightning module.

The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 5:
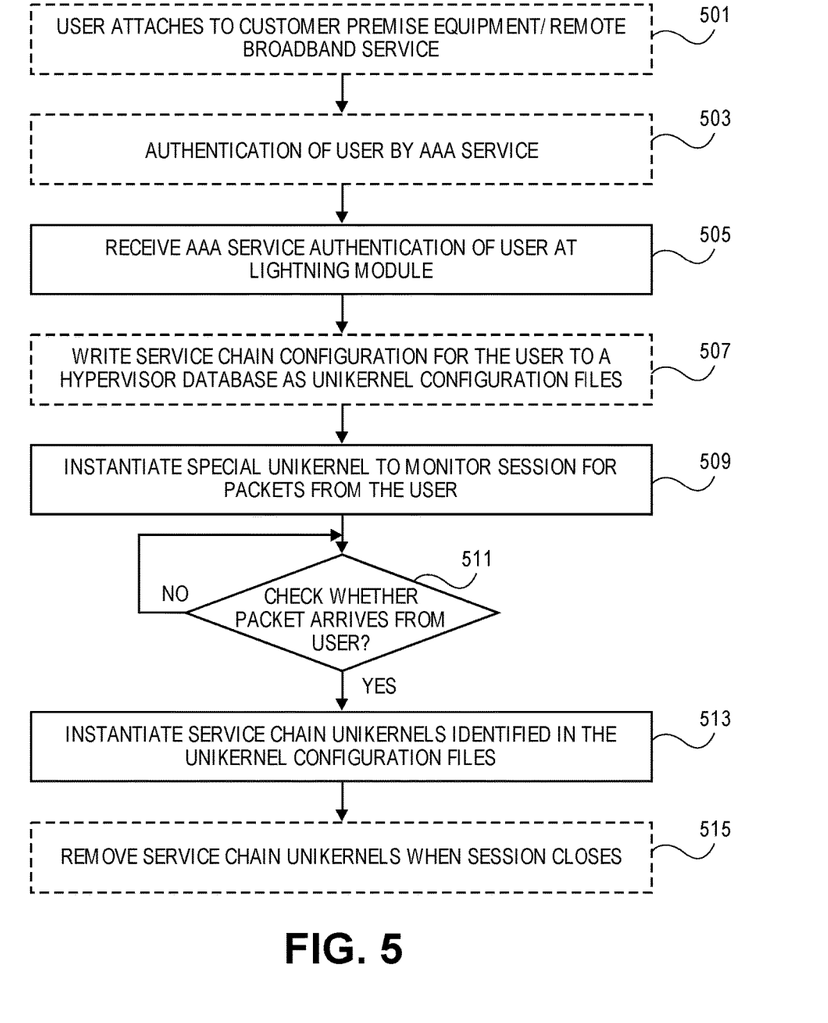
FIG. 5 is a flowchart of one embodiment of a process for service chain management.

FIG. 5 is a flowchart of one embodiment of a process for service chain management. The process can begin with a user attaching to customer premise equipment or remote broadband service such as via a virtual border network gateway or virtual evolved packet gateway (Block 501). The user connects via user equipment and establishes a session that is to traverse a virtual router or switch. The virtual border network gateway or virtual evolve packet gateway can request an authentication of the user from an AAA service (Block 503). The AAA service provides authentication of the user to the lightning module of the virtual switch or router, where the lightning module is a component of or in communication with the hypervisor and hypervisor database (Block 505). The received information can include configuration files or information about the service chaining applicable for the user.

The lightning module writes the service chain configuration for the user to a hypervisor database as a set of unikernel configuration files (Block 507). The lightning module then instantiates a special unikernel to monitor the session for packets from the user (Block 509). When packets from the user are received (Block 511), then the process instantiates the service chain unikernels identified in the unikernel configuration files. This starts with the first unikernel associated with the first service to be applied to the session being instantiated (Block 513). In turn after each service or micro-service completes it signals the next service or micro-service to start and then terminates. After all of the services defined for the service chain have completed then the session closes and the unikernels executing the services and micro-services are terminated and removed from the hypervisor database including the special unikernel.

Figure 6A:
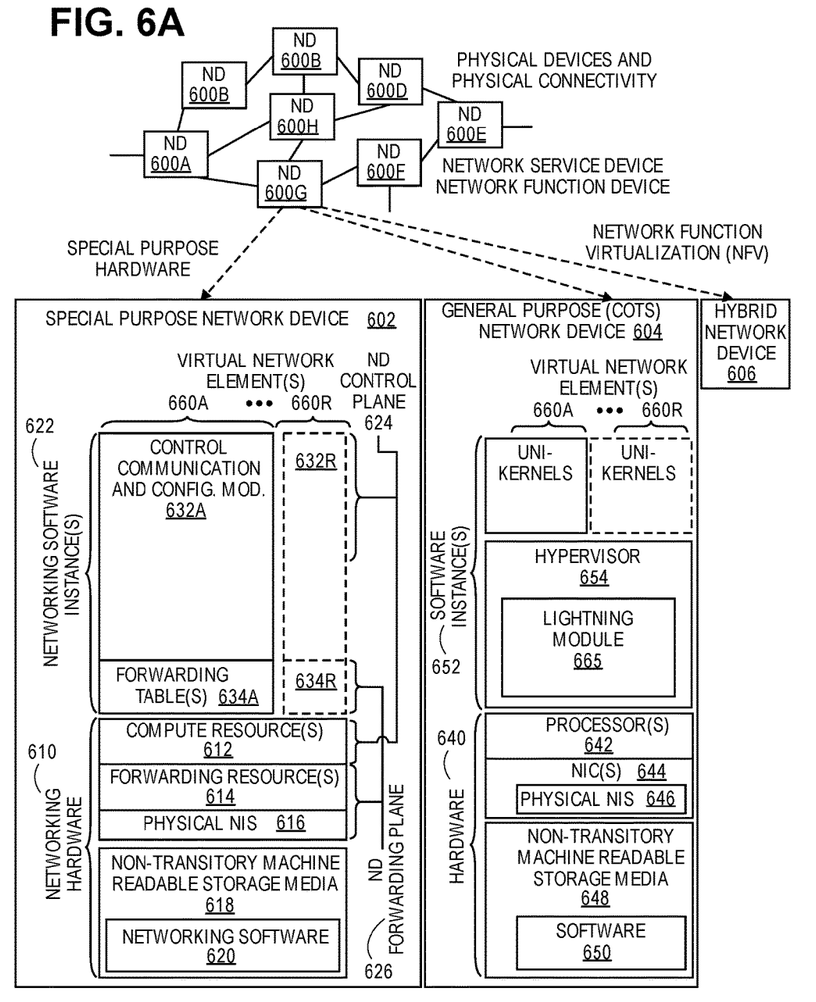
FIG. 6A illustrates connectivity between network devices (NDs) within an exemplary network, as well as three exemplary implementations of the NDs, according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a proprietary operating system (OS); and 2) a general purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

While this type of specialized network device 602 may be present in the network it does not implement the embodiments of the invention.

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

Figure 6B:
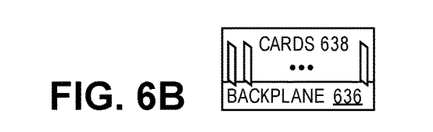
FIG. 6B illustrates an exemplary way to implement a special-purpose network device according to some embodiments of the invention.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650. During operation, the processor(s) 642 execute the software 650 to instantiate one or more sets of one or more applications 664A-R. While one embodiment does not implement virtualization, alternative embodiments may use different forms of virtualization—represented by a virtualization layer 654 including a lightning module 665 and unikernels 660A-R. For example, one such alternative embodiment implements operating system-level virtualization, in which case the virtualization layer 654 represents a hypervisor that allows for the creation of multiple unikernels as described herein above 660A-R that may each be used to execute one of the sets of micro-services. In this embodiment, the multiple unikernels 660A-R are each a user space instance, but may share a virtual memory space. The instantiation of the one or more sets of one or more micro-services as unikernels 660A-R, as well as the virtualization layer 654 are collectively referred to as software instance(s) 652.

The unikernels 660A-R perform functionality related to service chaining this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the unikernels 660A-R differently. In certain embodiments, the virtualization layer 654 includes a virtual switch that provides similar forwarding services as a physical Ethernet switch.

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple virtual network elements (VNEs) implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

Figure 6C:
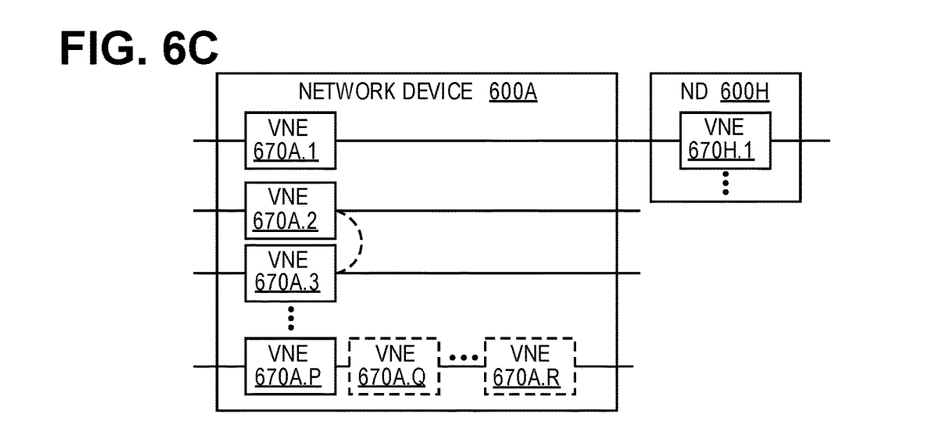
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method implemented by a network device, the method for implementing a service chain by instantiating services on demand by a lightning module that provides the services as applications executed by unikernels supported by a hypervisor, the method comprising:

receiving authentication, administration and accounting (AAA) service authentication of a user by the lightning module;

instantiating, by the lightning module, a special unikernel monitor to only monitor a session for packets from the user, in response to receiving the AAA service authentication of the user;

determining at least one unikernel configuration file for the user;

checking whether a packet from the user is received in the session by the special unikernel monitor; and responsive to detecting the packet, instantiating a plurality of service chain unikernels identified in the at least one unikernel configuration file, by the special unikernel monitor, the plurality of service chain unikernels to process packets of the session.

2. The method of claim 1, further comprising:
writing a service chain configuration for the user to a hypervisor database as the at least one unikernel configuration file.

3. The method of claim 1, further comprising:
terminating each of the service chain unikernels after each of the service chain unikernels signals completion of processing packets from the session,
wherein each of the service chain unikernels signals the lightning module upon completion of packet processing, and
wherein the lightning module instantiates a subsequent service chain unikernels to start packet processing.

4. The method of claim 1, wherein receiving AAA service authentication is in response to user attachment to customer premise equipment or remote broadband services.

5. The method of claim 2, wherein service chain configuration requirements are translated into the at least one unikernel configuration file by the hypervisor database.

6. The method of claim 1, wherein the service chain unikernels are instantiated in a plurality of computing devices.

7. A network device configured to execute a method for implementing a service chain by instantiating services on demand by a lightning module that provides the services as applications executed by a unikernel supported by a hypervisor, the network device comprising:
a non-transitory machine-readable storage medium, having stored therein the lightning module, a special unikernel monitor, and the hypervisor database; and
a processor coupled to the non-transitory machine-readable storage medium, the processor configured to execute the lightning module, the lightning module configured to receive authentication, administration and accounting (AAA) service authentication of a user, and to instantiate the special unikernel monitor to monitor a session for packets from the user, in response to receiving the AAA service authentication of the user, and the processor to execute the special unikernel monitor to check whether a packet from the user is received in the session, and responsive to detecting the packet, to instantiate service chain unikernels identified in at least one unikernel configuration file, the service chain unikernels to process the packet.

8. The network device of claim 7, wherein the lightning module is further configured to write a service chain configuration for the user to the hypervisor database as the at least one unikernel configuration file.

9. The network device of claim 7, wherein the lightning module is further configured to terminate each of the service chain unikernels signals completion of the processing packets from the session, wherein each of the service chain unikernels signals the lightning module upon completion of packet processing, and wherein the lightning module instantiates a subsequent service chain unikernels to start packet processing.

10. The network device of claim 7, wherein receiving AAA service authentication is in response to user attachment to customer premise equipment or remote broadband services.

11. The network device of claim 8, wherein service chain configuration requirements are translated into the at least one unikernel configuration file by the hypervisor database.

12. A non-transitory machine readable medium, having stored therein a set of instructions, which when executed cause a network device to perform a method for implementing a service chain by instantiating services on demand by a lightning module that provides the services as applications executed by a unikernel supported by a hypervisor, the set of instructions further comprising:
receiving authentication, administration and accounting (AAA) service authentication of a user by the lightning module;
instantiating, by the lightning module, a special unikernel monitor to only monitor a session for packets from the user, in response to receiving the AAA service authentication of the user;
determining at least one unikernel configuration file for the user;
checking whether a packet from the user is received in the session by the special unikernel monitor; and
responsive to detecting the packet, instantiating a plurality of service chain unikernels identified in the at least one unikernel configuration file, by the special unikernel monitor, the plurality of service chain unikernels to process packets of the session.

13. The non-transitory machine readable medium of claim 12, having further instructions stored therein comprising:
writing a service chain configuration for the user to a hypervisor database as the at least one unikernel configuration file.

14. The non-transitory machine readable medium of claim 12, having further instructions stored therein comprising:
terminating each of the service chain unikernels after each of the service chain unikernels signals completion of processing packets from the session,
wherein each of the service chain unikernels signals the lightning module upon completion of packet processing, and
wherein the lightning module instantiates a subsequent service chain unikernels to start packet processing.

15. The non-transitory machine readable medium of claim 12, wherein receiving AAA service authentication is in response to user attachment to customer premise equipment or remote broadband services.

16. The non-transitory machine readable medium of claim 13, wherein service chain configuration requirements are translated into the at least one unikernel configuration file by the hypervisor database.

17. The non-transitory machine readable medium of claim 12, wherein the service chain unikernels are instantiated in a plurality of computing devices.

* * * * *